(12) United States Patent
Mendolia

(10) Patent No.: US 8,655,286 B2
(45) Date of Patent: Feb. 18, 2014

(54) METHOD AND APPARATUS FOR TUNING A COMMUNICATION DEVICE

(75) Inventor: Gregory Mendolia, Hollis, NH (US)

(73) Assignee: BlackBerry Limited, Waterloo, Ontario (CA)

( * ) Notice: Subject to any disclaimer, the term of this patent is extended or adjusted under 35 U.S.C. 154(b) by 292 days.

(21) Appl. No.: 13/035,417

(22) Filed: Feb. 25, 2011

(65) Prior Publication Data

US 2012/0220243 A1     Aug. 30, 2012

(51) Int. Cl.
*H04B 1/40*     (2006.01)
(52) U.S. Cl.
USPC .............................................. 455/77; 455/69
(58) Field of Classification Search
USPC ........... 455/77, 41.1, 41.2, 41.3, 69; 343/702; 370/278
See application file for complete search history.

(56) References Cited

U.S. PATENT DOCUMENTS

| | | |
|---|---|---|
| 2,745,067 A | 5/1956 | True |
| 3,117,279 A | 1/1964 | Ludvigson |
| 3,160,832 A | 12/1964 | Beitman |
| 3,390,337 A | 6/1968 | Beitman |
| 3,443,231 A | 5/1969 | Roza |
| 3,509,500 A | 4/1970 | McNair |
| 3,571,716 A | 3/1971 | Hill |
| 3,590,385 A | 6/1971 | Sabo |
| 3,601,717 A | 8/1971 | Kuecken |
| 3,794,941 A | 2/1974 | Templin |
| 3,919,644 A | 11/1975 | Smolka |
| 3,990,024 A | 11/1976 | Hou |
| 3,995,237 A | 11/1976 | Brunner |
| 4,186,359 A | 1/1980 | Kaegebein |
| 4,201,960 A | 5/1980 | Skutta |
| 4,227,256 A | 10/1980 | O'Keefe |
| 4,383,441 A | 5/1983 | Willis |
| 4,476,578 A | 10/1984 | Gaudin |
| 4,493,112 A | 1/1985 | Bruene |
| 4,777,490 A | 10/1988 | Sharma |
| 4,799,066 A | 1/1989 | Deacon |
| 4,965,607 A | 10/1990 | Wilkins |
| 4,980,656 A | 12/1990 | Duffalo |
| 5,032,805 A | 7/1991 | Elmer |

(Continued)

FOREIGN PATENT DOCUMENTS

| | | |
|---|---|---|
| DE | 19614655 | 10/1997 |
| DE | 102008050743 | 4/2010 |

(Continued)

OTHER PUBLICATIONS

Patent Cooperation Treaty, "International Search Report and Written Opinion", International Application No. PCT/US2010/056413, Jul. 27, 2011.

(Continued)

*Primary Examiner* — Ping Hsieh
(74) *Attorney, Agent, or Firm* — Guntin & Gust, PLC; Andrew Gust

(57) ABSTRACT

A system that incorporates teachings of the present disclosure may include, for example, a non-transitory computer-readable storage medium including computer instructions to obtain at least one operational parameter associated with a communication device and to adjust a steerable antenna of the communication device when the communication device does not satisfy an impedance threshold, where the satisfying of the impedance threshold is determined based on the at least one operational parameter. Additional embodiments are disclosed.

15 Claims, 8 Drawing Sheets

(56) References Cited

U.S. PATENT DOCUMENTS

| | | |
|---|---|---|
| 5,142,255 A | 8/1992 | Chang |
| 5,177,670 A | 1/1993 | Shinohara |
| 5,195,045 A | 3/1993 | Keane |
| 5,200,826 A | 4/1993 | Seong |
| 5,212,463 A | 5/1993 | Babbitt |
| 5,243,358 A | 9/1993 | Sanford |
| 5,258,728 A | 11/1993 | Taniyoshi |
| 5,276,912 A | 1/1994 | Siwiak |
| 5,301,358 A | 4/1994 | Gaskill |
| 5,307,033 A | 4/1994 | Koscica |
| 5,310,358 A | 5/1994 | Johnson |
| 5,312,790 A | 5/1994 | Sengupta |
| 5,334,958 A | 8/1994 | Babbitt |
| 5,371,473 A | 12/1994 | Trinh |
| 5,409,889 A | 4/1995 | Das |
| 5,427,988 A | 6/1995 | Sengupta |
| 5,430,417 A | 7/1995 | Martin |
| 5,446,447 A | 8/1995 | Carney |
| 5,448,252 A | 9/1995 | Ali |
| 5,451,567 A | 9/1995 | Das |
| 5,451,914 A | 9/1995 | Stengel |
| 5,457,394 A | 10/1995 | McEwan |
| 5,472,935 A | 12/1995 | Yandrofski |
| 5,479,139 A | 12/1995 | Koscica |
| 5,486,491 A | 1/1996 | Sengupta |
| 5,496,795 A | 3/1996 | Das |
| 5,502,372 A | 3/1996 | Quan |
| 5,524,281 A | 6/1996 | Bradley |
| 5,548,837 A | 8/1996 | Hess et al. |
| 5,561,407 A | 10/1996 | Koscica |
| 5,564,086 A | 10/1996 | Cygan |
| 5,589,844 A | 12/1996 | Belcher et al. |
| 5,593,495 A | 1/1997 | Masuda |
| 5,635,433 A | 6/1997 | Sengupta |
| 5,635,434 A | 6/1997 | Sengupta |
| 5,640,042 A | 6/1997 | Koscica |
| 5,679,624 A | 10/1997 | Das |
| 5,689,219 A | 11/1997 | Piirainen |
| 5,693,429 A | 12/1997 | Sengupta |
| 5,694,134 A | 12/1997 | Barnes |
| 5,699,071 A | 12/1997 | Urakami |
| 5,766,697 A | 6/1998 | Sengupta |
| 5,777,581 A | 7/1998 | Lilly |
| 5,778,308 A | 7/1998 | Sroka |
| 5,786,727 A | 7/1998 | Sigmon |
| 5,812,572 A | 9/1998 | King |
| 5,812,943 A | 9/1998 | Suzuki |
| 5,830,591 A | 11/1998 | Sengupta |
| 5,846,893 A | 12/1998 | Sengupta |
| 5,874,926 A | 2/1999 | Tsuru |
| 5,880,635 A | 3/1999 | Satoh |
| 5,886,867 A | 3/1999 | Chivukula |
| 5,892,482 A | 4/1999 | Coleman et al. |
| 5,929,717 A | 7/1999 | Richardson |
| 5,963,871 A | 10/1999 | Zhinong |
| 5,969,582 A | 10/1999 | Boesch |
| 5,990,766 A | 11/1999 | Zhang |
| 6,009,124 A | 12/1999 | Smith |
| 6,020,787 A | 2/2000 | Kim |
| 6,020,795 A | 2/2000 | Kim |
| 6,029,075 A | 2/2000 | Das |
| 6,045,932 A | 4/2000 | Jia |
| 6,061,025 A | 5/2000 | Jackson |
| 6,074,971 A | 6/2000 | Chiu |
| 6,096,127 A | 8/2000 | Dimos |
| 6,100,733 A | 8/2000 | Dortu |
| 6,101,102 A | 8/2000 | Brand |
| 6,115,585 A | 9/2000 | Matero |
| 6,133,883 A | 10/2000 | Munson |
| 6,172,385 B1 | 1/2001 | Duncombe |
| 6,215,644 B1 | 4/2001 | Dhuler |
| 6,281,847 B1 | 8/2001 | Lee |
| 6,343,208 B1 | 1/2002 | Ying |
| 6,377,142 B1 | 4/2002 | Chiu |
| 6,377,217 B1 | 4/2002 | Zhu |
| 6,377,440 B1 | 4/2002 | Zhu |
| 6,384,785 B1 | 5/2002 | Kamogawa |
| 6,404,614 B1 | 6/2002 | Zhu |
| 6,408,190 B1 | 6/2002 | Ying |
| 6,414,562 B1 | 7/2002 | Bouisse |
| 6,415,562 B1 | 7/2002 | Donaghue |
| 6,452,776 B1 | 9/2002 | Chakravorty |
| 6,461,930 B2 | 10/2002 | Akram |
| 6,466,774 B1 | 10/2002 | Okabe |
| 6,492,883 B2 | 12/2002 | Liang |
| 6,514,895 B1 | 2/2003 | Chiu |
| 6,525,630 B1 | 2/2003 | Zhu |
| 6,531,936 B1 | 3/2003 | Chiu |
| 6,535,076 B2 | 3/2003 | Partridge |
| 6,535,722 B1 | 3/2003 | Rosen |
| 6,538,603 B1 | 3/2003 | Chen |
| 6,556,102 B1 | 4/2003 | Sengupta |
| 6,556,814 B1 | 4/2003 | Klomsdorf |
| 6,570,462 B2 | 5/2003 | Edmonson |
| 6,590,468 B2 | 7/2003 | du Toit et al. |
| 6,590,541 B1 | 7/2003 | Schultze |
| 6,597,265 B2 | 7/2003 | Liang |
| 6,608,603 B2 | 8/2003 | Alexopoulos |
| 6,624,786 B2 | 9/2003 | Boyle |
| 6,640,085 B1 | 10/2003 | Chatzipetros |
| 6,657,595 B1 * | 12/2003 | Phillips et al. ............... 343/702 |
| 6,661,638 B2 | 12/2003 | Jackson et al. |
| 6,670,256 B2 | 12/2003 | Yang |
| 6,710,651 B2 | 3/2004 | Forrester |
| 6,724,611 B1 | 4/2004 | Mosley |
| 6,724,890 B1 | 4/2004 | Bareis |
| 6,737,179 B2 | 5/2004 | Sengupta |
| 6,759,918 B2 | 7/2004 | Du Toit |
| 6,765,540 B2 | 7/2004 | Toncich |
| 6,768,472 B2 | 7/2004 | Alexopoulos |
| 6,774,077 B2 | 8/2004 | Sengupta |
| 6,795,712 B1 | 9/2004 | Vakilian |
| 6,825,818 B2 | 11/2004 | Toncich |
| 6,839,028 B2 | 1/2005 | Lee |
| 6,845,126 B2 | 1/2005 | Dent |
| 6,859,104 B2 | 2/2005 | Toncich |
| 6,862,432 B1 | 3/2005 | Kim |
| 6,864,757 B2 | 3/2005 | Du Toit |
| 6,868,260 B2 | 3/2005 | Jagielski |
| 6,888,714 B2 | 5/2005 | Shaw |
| 6,905,989 B2 | 6/2005 | Ellis |
| 6,907,234 B2 | 6/2005 | Karr |
| 6,920,315 B1 | 7/2005 | Wilcox |
| 6,943,078 B1 | 9/2005 | Zheng |
| 6,946,847 B2 | 9/2005 | Nishimori |
| 6,949,442 B2 | 9/2005 | Barth |
| 6,961,368 B2 | 11/2005 | Dent |
| 6,964,296 B2 | 11/2005 | Memory |
| 6,965,837 B2 | 11/2005 | Vintola |
| 6,993,297 B2 | 1/2006 | Smith |
| 7,009,455 B2 | 3/2006 | Toncich |
| 7,071,776 B2 | 7/2006 | Forrester |
| 7,106,715 B1 | 9/2006 | Kelton |
| 7,107,033 B2 | 9/2006 | D du Toit |
| 7,113,614 B2 | 9/2006 | Rhoads |
| 7,151,411 B2 | 12/2006 | Martin |
| 7,176,634 B2 | 2/2007 | Kitamura |
| 7,176,845 B2 | 2/2007 | Fabrega-Sanchez |
| 7,180,467 B2 | 2/2007 | Fabrega-Sanchez |
| 7,221,327 B2 | 5/2007 | Toncich |
| 7,298,329 B2 | 11/2007 | Diament |
| 7,312,118 B2 | 12/2007 | Kiyotoshi |
| 7,332,980 B2 | 2/2008 | Zhu |
| 7,332,981 B2 | 2/2008 | Matsuno |
| 7,339,527 B2 | 3/2008 | Sager |
| 7,426,373 B2 | 9/2008 | Clingman |
| 7,427,949 B2 | 9/2008 | Channabasappa et al. |
| 7,453,405 B2 * | 11/2008 | Nishikido et al. ............ 343/702 |
| 7,468,638 B1 | 12/2008 | Tsai |
| 7,535,080 B2 | 5/2009 | Zeng et al. |
| 7,535,312 B2 | 5/2009 | McKinzie |
| 7,539,527 B2 | 5/2009 | Jang |
| 7,596,357 B2 | 9/2009 | Nakamata |
| 7,633,355 B2 | 12/2009 | Matsuo |

(56) References Cited

U.S. PATENT DOCUMENTS

| | | |
|---|---|---|
| 7,667,663 B2 | 2/2010 | Hsiao |
| 7,705,692 B2 | 4/2010 | Fukamachi et al. |
| 7,711,337 B2 | 5/2010 | McKinzie |
| 7,714,678 B2 | 5/2010 | du Toit |
| 7,728,693 B2 | 6/2010 | du Toit |
| 7,768,400 B2 | 8/2010 | Lawrence et al. |
| 7,786,819 B2 | 8/2010 | Ella |
| 7,795,990 B2 | 9/2010 | du Toit |
| 7,852,170 B2 | 12/2010 | McKinzie |
| 7,865,154 B2 | 1/2011 | Mendolia |
| 7,907,094 B2 | 3/2011 | Kakitsu et al. |
| 7,917,104 B2 | 3/2011 | Manssen et al. |
| 7,969,257 B2 | 6/2011 | du Toit |
| 7,991,363 B2 | 8/2011 | Greene |
| 8,112,043 B2 | 2/2012 | Knudsen et al. |
| 8,170,510 B2 | 5/2012 | Knudsen et al. |
| 8,190,109 B2 | 5/2012 | Ali et al. |
| 8,217,732 B2 | 7/2012 | McKinzie |
| 8,299,867 B2 | 10/2012 | McKinzie |
| 8,320,850 B1 | 11/2012 | Khlat |
| 8,442,457 B2 * | 5/2013 | Harel et al. ............ 455/101 |
| 2002/0008672 A1 | 1/2002 | Gothard et al. |
| 2002/0030566 A1 | 3/2002 | Bozler |
| 2002/0109642 A1 | 8/2002 | Gee et al. |
| 2002/0118075 A1 | 8/2002 | Ohwada |
| 2002/0145483 A1 | 10/2002 | Bouisse |
| 2002/0167963 A1 | 11/2002 | Joa-Ng |
| 2002/0187780 A1 | 12/2002 | Souissi |
| 2002/0191703 A1 | 12/2002 | Ling et al. |
| 2002/0193088 A1 | 12/2002 | Jung |
| 2003/0060227 A1 | 3/2003 | Sekine |
| 2003/0071300 A1 | 4/2003 | Yashima |
| 2003/0114124 A1 | 6/2003 | Higuchi |
| 2003/0142022 A1 | 7/2003 | Ollikainen |
| 2003/0193997 A1 | 10/2003 | Dent |
| 2003/0199286 A1 | 10/2003 | D du Toit |
| 2003/0210206 A1 | 11/2003 | Phillips |
| 2003/0232607 A1 | 12/2003 | Le Bars |
| 2004/0009754 A1 | 1/2004 | Smith |
| 2004/0090372 A1 | 5/2004 | Nallo |
| 2004/0100341 A1 | 5/2004 | Luetzelschwab |
| 2004/0127178 A1 | 7/2004 | Kuffner |
| 2004/0137950 A1 | 7/2004 | Bolin |
| 2004/0202399 A1 | 10/2004 | Kochergin |
| 2004/0257293 A1 | 12/2004 | Friedrich et al. |
| 2005/0007291 A1 | 1/2005 | Fabrega-Sanchez |
| 2005/0032488 A1 | 2/2005 | Pehlke |
| 2005/0032541 A1 | 2/2005 | Wang |
| 2005/0042994 A1 | 2/2005 | Otaka |
| 2005/0059362 A1 | 3/2005 | Kalajo |
| 2005/0082636 A1 | 4/2005 | Yashima |
| 2005/0085204 A1 | 4/2005 | Poilasne et al. |
| 2005/0093624 A1 | 5/2005 | Forrester et al. |
| 2005/0130608 A1 | 6/2005 | Forse |
| 2005/0130699 A1 | 6/2005 | Kim |
| 2005/0208960 A1 | 9/2005 | Hassan |
| 2005/0215204 A1 | 9/2005 | Wallace |
| 2005/0264455 A1 | 12/2005 | Talvitie |
| 2005/0282503 A1 | 12/2005 | Onno |
| 2006/0003537 A1 | 1/2006 | Sinha |
| 2006/0009165 A1 | 1/2006 | Alles |
| 2006/0160501 A1 | 7/2006 | Mendolia |
| 2006/0183433 A1 | 8/2006 | Mori |
| 2006/0183442 A1 | 8/2006 | Chang et al. |
| 2006/0205368 A1 | 9/2006 | Bustamante |
| 2006/0281423 A1 | 12/2006 | Caimi et al. |
| 2007/0013483 A1 | 1/2007 | Stewart |
| 2007/0035458 A1 | 2/2007 | Ohba |
| 2007/0042725 A1 | 2/2007 | Poilasne |
| 2007/0042734 A1 | 2/2007 | Ryu |
| 2007/0080888 A1 | 4/2007 | Mohamadi |
| 2007/0082611 A1 | 4/2007 | Terranova et al. |
| 2007/0085609 A1 | 4/2007 | Itkin |
| 2007/0142014 A1 | 6/2007 | Wilcox |
| 2007/0149146 A1 | 6/2007 | Hwang |
| 2007/0182636 A1 | 8/2007 | Carlson |
| 2007/0184825 A1 | 8/2007 | Lim et al. |
| 2007/0194859 A1 | 8/2007 | Brobston |
| 2007/0197180 A1 | 8/2007 | McKinzie et al. |
| 2007/0200766 A1 | 8/2007 | McKinzie |
| 2007/0285326 A1 | 12/2007 | McKinzie |
| 2007/0293176 A1 | 12/2007 | Yu |
| 2008/0007478 A1 | 1/2008 | Jung |
| 2008/0018541 A1 | 1/2008 | Pang |
| 2008/0055016 A1 | 3/2008 | Morris, III et al. |
| 2008/0081670 A1 | 4/2008 | Rofougaran |
| 2008/0106350 A1 | 5/2008 | McKinzie |
| 2008/0122553 A1 | 5/2008 | McKinzie |
| 2008/0122723 A1 | 5/2008 | Rofougaran |
| 2008/0129612 A1 | 6/2008 | Wang |
| 2008/0158076 A1 | 7/2008 | Walley |
| 2008/0261544 A1 | 10/2008 | Blin |
| 2008/0274706 A1 | 11/2008 | Blin |
| 2008/0300027 A1 | 12/2008 | Dou et al. |
| 2008/0305749 A1 | 12/2008 | Ben-Bassat |
| 2009/0002077 A1 | 1/2009 | Rohani et al. |
| 2009/0027286 A1 | 1/2009 | Ohishi |
| 2009/0082017 A1 | 3/2009 | Chang et al. |
| 2009/0109880 A1 | 4/2009 | Kim |
| 2009/0121963 A1 | 5/2009 | Greene |
| 2009/0149136 A1 | 6/2009 | Rofougaran |
| 2009/0180403 A1 | 7/2009 | Tudosoiu |
| 2009/0215446 A1 | 8/2009 | Hapsari et al. |
| 2009/0231220 A1 | 9/2009 | Zhang et al. |
| 2009/0253385 A1 | 10/2009 | Dent et al. |
| 2009/0264065 A1 | 10/2009 | Song |
| 2009/0278685 A1 | 11/2009 | Potyrailo |
| 2009/0323582 A1 | 12/2009 | Proctor et al. |
| 2010/0041348 A1 | 2/2010 | Wilcox et al. |
| 2010/0053009 A1 | 3/2010 | Rofougaran |
| 2010/0073103 A1 | 3/2010 | Spears et al. |
| 2010/0085260 A1 | 4/2010 | McKinzie |
| 2010/0105425 A1 | 4/2010 | Asokan |
| 2010/0156552 A1 | 6/2010 | McKinzie |
| 2010/0232474 A1 | 9/2010 | Rofougaran et al. |
| 2010/0285836 A1 | 11/2010 | Horihata et al. |
| 2010/0302106 A1 | 12/2010 | Knudsen et al. |
| 2010/0304688 A1 | 12/2010 | Knudsen |
| 2011/0012790 A1 | 1/2011 | Badaruzzaman |
| 2011/0086630 A1 | 4/2011 | Manssen |
| 2011/0102290 A1 | 5/2011 | Milosavljevic |
| 2011/0105023 A1 | 5/2011 | Scheer et al. |
| 2011/0121079 A1 | 5/2011 | Lawrence et al. |
| 2011/0133994 A1 | 6/2011 | Korva |
| 2011/0183628 A1 | 7/2011 | Baker |
| 2011/0183633 A1 | 7/2011 | Ohba et al. |
| 2011/0256857 A1 | 10/2011 | Chen et al. |
| 2011/0281532 A1 | 11/2011 | Shin et al. |
| 2011/0299438 A1 * | 12/2011 | Mikhemar et al. ............ 370/280 |
| 2012/0075159 A1 | 3/2012 | Chang |
| 2012/0100802 A1 | 4/2012 | Mohebbi |
| 2012/0243579 A1 | 9/2012 | Premakanthan et al. |

FOREIGN PATENT DOCUMENTS

| | | |
|---|---|---|
| EP | 0685936 | 6/1995 |
| EP | 0909024 | 4/1999 |
| EP | 1079296 | 2/2001 |
| EP | 1137192 | 9/2001 |
| EP | 1298810 | 4/2006 |
| EP | 2328233 | 6/2011 |
| JP | 03276901 | 3/1990 |
| JP | 9321526 | 12/1997 |
| JP | 10209722 | 8/1998 |
| KR | 100645526 | 11/2006 |
| KR | 10-0740177 | 7/2007 |
| WO | 01/71846 | 9/2001 |
| WO | 2006/031170 | 3/2006 |
| WO | 2008/030165 | 3/2008 |
| WO | WO-2009/064968 | 5/2009 |
| WO | 2009/155966 | 12/2009 |
| WO | WO-2011/044592 | 4/2011 |
| WO | 2011/084716 | 7/2011 |

(56) References Cited

FOREIGN PATENT DOCUMENTS

| WO | WO-2011/133657 | 10/2011 |
|----|----------------|---------|
| WO | WO-2011028453  | 10/2011 |
| WO | 2012/085932    | 6/2012  |

OTHER PUBLICATIONS

Bezooijen, A. et al., "A GSM/EDGE/WCDMA Adaptive Series-LC Matching Network Using RF-MEMS Switches", IEEE Journal of Solid-State Circuits, vol. 43, No. 10, Oct. 2008, 2259-2268.
Payandehjoo, Kasra , "Novel Techniques for Coupling Reduction in Multi-Antenna Hand-held Devices", IEEE Student Member, 1-8.
Petit, Laurent , "MEMS-Switched Parasitic-Antenna Array for Radiation Pattern Diversity", IEEE Transactions on Antennas and Propagation, vol. 54, No. 9, Sep. 2009, 2624-2631.
Zuo, S. , "Eigenmode Decoupling for Mimo Loop-Antenna Based on 180 Coupler", Progress in Electromagnetics Research Letters, vol. 26, 2011, 11-20.
Hyun, S. , "Effects of strain on the dielectric properties of tunable dielectric SrTiO3 thin films", Applied Physics Letters, 2004 American Institute of Physics.
Ida, I. et al., "An Adaptive Impedence Matching System and Its Application to Mobile Antennas", TENCON 2004, IEEE Region 10 Conference, See Abstract ad p. 544, Nov. 21-24, 2004, 543-547.
Patent Cooperation Treaty, , "International Search Report and Written Opinion", International Applicaton No. PCT/US2010/046241, Mar. 2, 2011.
Patent Cooperation Treaty, , "International Search Report and Written Opinion", PCT Application No. PCT/US08/005085, Jul. 2, 2008.
Pervez, N.K. , "High Tunability barium strontium titanate thin films for RF circuit applications", Applied Physics Letters, 2004 American Institute of Physics.
Qiao, et al., "Antenna Impedance Mismatch Measurement and Correction for Adaptive COMA Transceivers", IEEE, 2005.
Qiao, et al., "Measurement of Antenna Load Impedance for power Amplifiers", The Department of Electrical and Computer Engineering, University of California, San Diego, Sep. 13, 2004.
Stemmer, Susanne , "Low-loss tunable capacitors fabricated directly on gold bottom electrodes", University of California Postprints 2006.
Taylor, T.R. , "Impact of thermal strain on the dielectric constant of sputtered barium strontium titanate thin films", Applied Physics Letters, 2002 American Institute of Physics.
Tombak, Ali , Tunable Barium Strontium Titanate Thin Film Capacitors for RF and Microwave Applications. IEEE Microwave and Wireles Components Letters, vol. 12, Jan. 2002.
Xu, Hongtao , "Tunable Microwave Integrated Circuits using BST Thin Film Capacitors with Device", Integrated Ferroelectrics, Department of Electrical Engineering and Computer Engineering, University of California, 2005.
Huang, Libo et al., "Theoretical and experimental investigation of adaptive antenna impedance matching for multiband mobile phone applications", IEEE, 09/07/205, 13-17.
Patent Cooperation Treaty, "International Search Report and Written Opinion", Nov. 16, 2011, International Application No. PCT/US/2011/038543.
Du Toit, , "Tunable Microwave Devices with Auto Adjusting Matching Circuit", U.S. Appl. No. 13/302,617, filed Nov. 22, 2011.
Du Toit, , "Tunable Microwave Devices with Auto-Adjusting Matching Circuit", U.S. Appl. No. 13/302,649, filed Nov. 22, 2011.
Greene, , "Method and Apparatus for Tuning a Communication Device", U.S. Appl. No. 13/108,463, filed May 16, 2011.
Greene, , "Method and Apparatus for Tuning a Communication Device", U.S. Appl. No. 13/108,589, filed May 16, 2011.
Hoirup, , "Method and Apparatus for Radio Antenna Frequency Tuning", U.S. Appl. No. 13/030,177, filed Feb. 18, 2011.
Mansse, , "Method and Apparatus for Managing Interference in a Communication Device", U.S. Appl. No. 61/326,206, filed Apr. 20, 2010.
Manssen, , "Method and Apparatus for Tuning Antennas in a Communication Device", U.S. Appl. No. 12/941,972, filed Nov. 8, 2010.
Manssen, , "Method and Apparatus for Tuning Antennas in a Communication Device", U.S. Appl. No. 13/005,122, filed Jan. 12, 2011.
McKinzie, , "Adaptive Impedance Matching Module (AIMM) Control Architectures", U.S. Appl. No. 13/293,544, filed Nov. 10, 2011.
McKinzie, , "Adaptive Impedance Matching Module (AIMM) Control Architectures", U.S. Appl. No. 13/293,550, filed Nov. 10, 2011.
McKinzie, , "Method and Apparatus for Adaptive Impedance Matching", U.S. Appl. No. 13/217,748, filed Aug. 25, 2011.
Mendolia, , "Method and Apparatus for Tuning a Communication Device", U.S. Appl. No. 13/035,417, filed Feb. 25, 2011.
Paratek Microwave, Inc., "Method and Appartus for Tuning Antennas in a Communication Device", International Application No. PCT/US11/59620; Filed Nov. 7, 2011.
Spears, , "Methods for Tuning an Adaptive Impedance Matching Network with a Look-Up Table", U.S. Appl. No. 13/297,951, filed Nov. 16, 2011.

* cited by examiner

400

600

US 8,655,286 B2

METHOD AND APPARATUS FOR TUNING A COMMUNICATION DEVICE

FIELD OF THE DISCLOSURE

The present disclosure relates generally to communication devices, and more specifically to a method and apparatus for tuning a communication device.

BACKGROUND

The human body can reduce the overall efficiency of a radio. Two of the mechanisms for this loss can be mismatch loss and absorptive loss. As the phone's environment changes and the user holds the phone in various ways, the antenna of the radio is "de-tuned", which can cause an impedance mismatch between the antenna and the rest of the radio. This results in power being reflected and wasted as heat. An even greater amount of power can also be lost due to absorption of energy into the human body.

Electrically steerable antennas for communication devices are known. Either the main lobe of the antenna or the null(s) of the antenna can be steered by means of altering the RF currents on the antenna or ground plane below the antenna, or changing the phase of the signal applied to the antenna(s). Furthermore, analog or digital components can be placed on the antenna itself to change the electrical characteristics and thus "steer" the antenna. Often, when the ground plane of the antenna is as small as the main circuit board found in typical mobile phones, the amount of steering achievable by such methods is limited. However, the amount of antenna pattern steering may be sufficient to steer a significant amount of the pattern away from near field objects, such as the user.

DETAILED DESCRIPTION

One embodiment of the present disclosure entails a method including obtaining at least one operational parameter associated with a steerable antenna of a mobile communication device, determining whether the mobile communication device satisfies an impedance threshold based on the at least one operational parameter, and adjusting the steerable antenna when the mobile communication device does not satisfy the impedance threshold.

One embodiment of the present disclosure entails an apparatus operably coupled with a mobile communication device. The apparatus can include a memory and a controller. The controller can be configured for adjusting a steerable antenna of the mobile communication device to reduce obstruction in a near field of the steerable antenna, and adjusting a matching network of the mobile communication device in response to an antenna mismatch.

One embodiment of the present disclosure entails non-transitory computer-readable storage medium that include computer instructions to obtain at least one operational parameter associated with a communication device and to adjust a steerable antenna of the communication device when the communication device does not satisfy an impedance threshold, where the satisfying of the impedance threshold is determined based on the at least one operational parameter.

Figure 1:
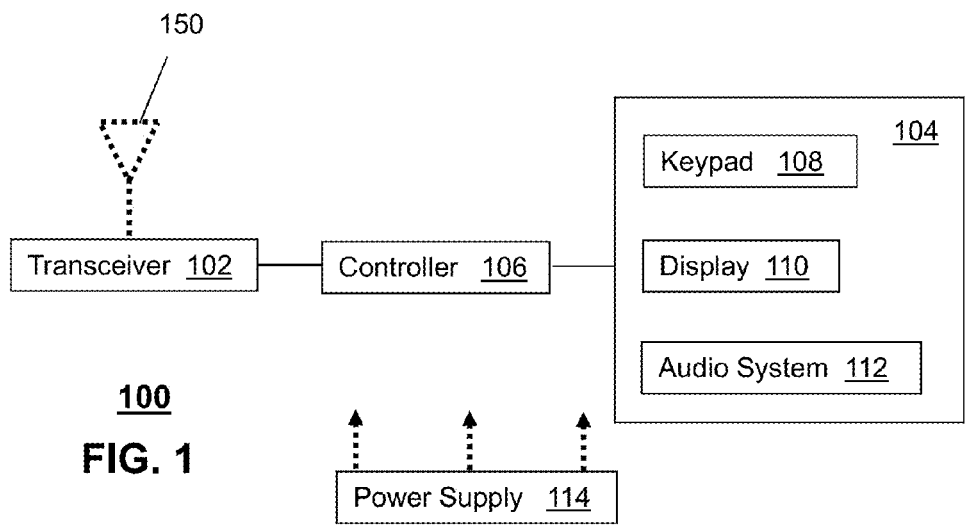
FIG. 1 depicts an illustrative embodiment of a communication device.

FIG. 1 depicts an exemplary embodiment of a communication device 100. The communication device 100 can comprise a wireless transceiver 102 (herein having independent transmit and receiver sections), a user interface (UI) 104, a power supply 114, and a controller 106 for managing operations thereof. The wireless transceiver 102 can utilize short-range or long-range wireless access technologies such as Bluetooth, WiFi, Digital Enhanced Cordless Telecommunications (DECT), or cellular communication technologies, just to mention a few. Cellular technologies can include, for example, CDMA-1x, WCDMA, UMTS/HSDPA, GSM/GPRS, TDMA/EDGE, EV/DO, WiMAX, and next generation cellular wireless communication technologies as they arise.

The UI 104 can include a depressible or touch-sensitive keypad 108 with a navigation mechanism such as a roller ball, joystick, mouse, or navigation disk for manipulating operations of the communication device 100. The keypad 108 can be an integral part of a housing assembly of the communication device 100 or an independent device operably coupled thereto by a tethered wireline interface (such as a flex cable) or a wireless interface supporting for example Bluetooth. The keypad 108 can represent a numeric dialing keypad commonly used by phones, and/or a Qwerty keypad with alphanumeric keys. The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is a touch-sensitive display, a portion or all of the keypad 108 can be presented by way of the display.

The power supply 114 can utilize common power management technologies (such as replaceable batteries, supply regulation technologies, and charging system technologies) for supplying energy to the components of the communication device 100 to facilitate portable applications. The controller 106 can utilize computing technologies such as a microprocessor and/or digital signal processor (DSP) with associated storage memory such a Flash, ROM, RAM, SRAM, DRAM or other like technologies.

Figure 2:
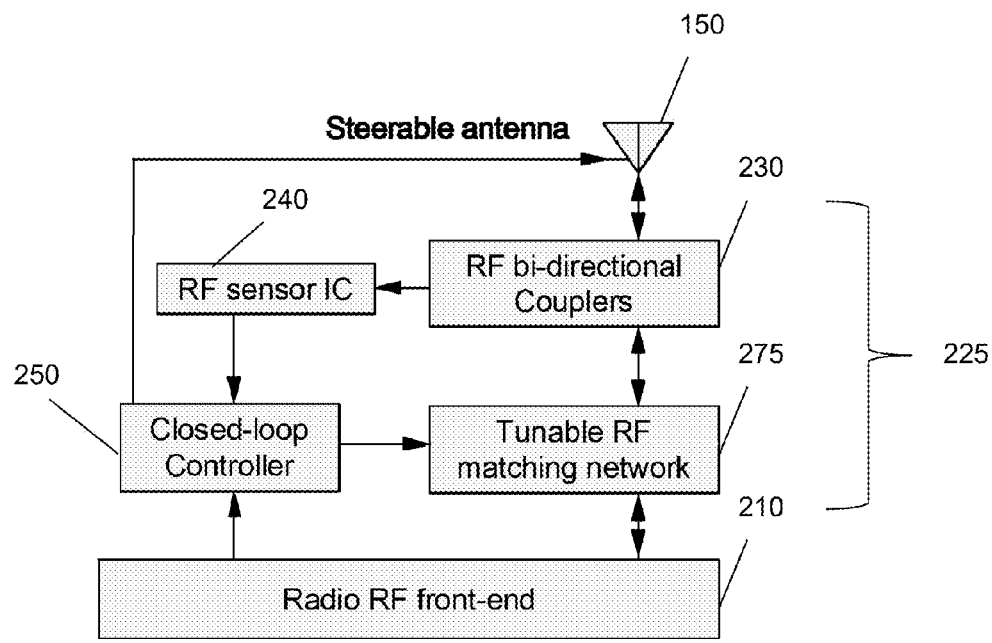
FIG. 2 depicts an illustrative embodiment of a portion of the communication device of FIG. 1 that can perform tuning for reducing absorption losses and SAR.

Referring to FIG. 2, a mobile device 200 is shown which allows for antenna steering. The mobile device 200 can have an antenna 150 and an RF front end module 210 which are designed such that their performance in free space is improved (e.g., optimized), and intentionally detuned when any objects (e.g., the user of the device) is near or touching the mobile device.

Mobile device 200 can include a closed loop system 225 to control the steerable antenna 150. The input to this closed loop system 225 can be various information, including information acting as a measure of how much energy is efficiently being transmitted and/or received by the mobile device 200 with respect to the intended communication point, such as a base station, as compared with how much energy is being wasted or lost due to absorption into near field objects, such as the user's hand or head. In one preferred embodiment, the information used for this comparison of the power properly transmitted versus absorbed, can be the impedance of the antenna 150.

In one embodiment, the closed-loop system 225 can include one or more bi-directional couplers 230 and RF sensors 240 which serve to monitor the antenna match. However, the present disclosure contemplates the use of other components for monitoring of the antenna match. In this exemplary embodiment, the antenna 150 can be designed with a 50 ohm match in free space, which allows deviations, including major deviations, from this "baseline antenna match" to be recognized as being caused by objects near the antenna such as the user's hand or head. However, the present disclosure contemplates the antenna 150 being designed with other matches in free space, which can be less than or greater than 50 ohms, resulting in a "baseline antenna match" which is not necessarily 50 ohms.

In another embodiment, a baseline of the actual antenna impedance in free space or other baseline values can be stored in a memory, (e.g., storing the antenna impedance and mismatch in free space), rather than using a perfect 50 ohm match as a baseline. For instance, the use of values stored in memory can be applied when the antenna 150 cannot be perfectly matched in free space for all required frequency bands or all mechanical configurations of the mobile phone 200. In one embodiment, this can be performed without using proximity sensors, and/or can be used in conjunction with various types of steerable antennas 150 under the control of the closed-loop controller 250. Impedance matching for the antenna 150 can be performed in addition to this closed-loop antenna steering, by using a tunable RF matching network 275, which can also be controlled by the same closed-loop controller 250 and/or other control devices.

Figure 3:
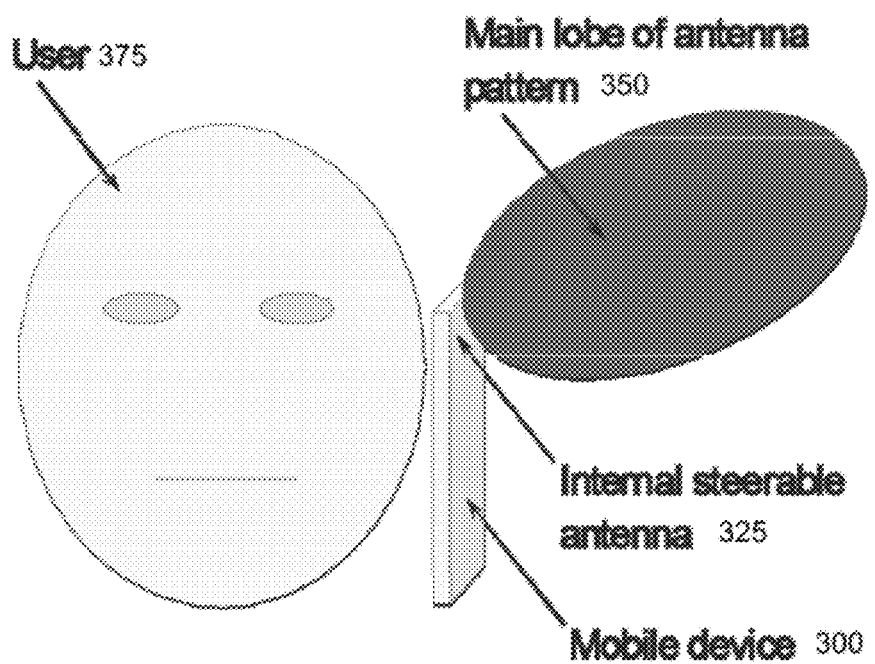
FIG. 3 depicts an illustrative embodiment of a mobile communication device with a steerable antenna used to move an antenna pattern away from a user or any object in close proximity to the antenna.

Referring to FIG. 3, a mobile device 300 is shown having an internal steerable antenna 325. The mobile device 300 allows for adjustment to an antenna pattern of the internal steerable antenna 325, such that the pattern is adjusted, steered or moved away from a user 375. For example, the main steerable lobe 350 can be adjusted through movement away from the user and/or through moving a steerable null towards the user. Mobile device 300 can utilize the impedance of the antenna 325 as the feedback parameter to sense or otherwise determine if there is an object close to the mobile device.

In one embodiment, mobile device 300 does not rely upon the type of steerable antenna and/or the end product it is used in for determining if there is an object in close proximity to the antenna 325 or mobile device. In another embodiment, the determination of whether an object is in proximity to the antenna and/or the adjustment of the position of the steerable antenna 325 can be performed based only on monitoring impedance of the antenna. As an example, the antenna's impedance in free space can be used as the "baseline" impedance. Deviation from this impedance can be monitored as an indication that an object is detuning the antenna with power being either absorbed and/or reflected by the object.

In one embodiment, by measuring the reflected power with a coupler to determine magnitude and phase of the reflections, at any channel/frequency of operation, one can determine the impedance of the antenna in free space. Continuing with this example under normal use of the portable wireless device 300, a dual directional coupler can be used to continuously monitor the magnitude and phase of both the forward and reflected RF signal as the radio transmits and receives communication signals. This coupler can be placed in close proximity to the antenna's input port, with the output of the coupler fed into a detector to convert these RF signals to usable voltage levels which in turn are used in a closed loop feedback system to adjust the antenna steering.

Figure 4:
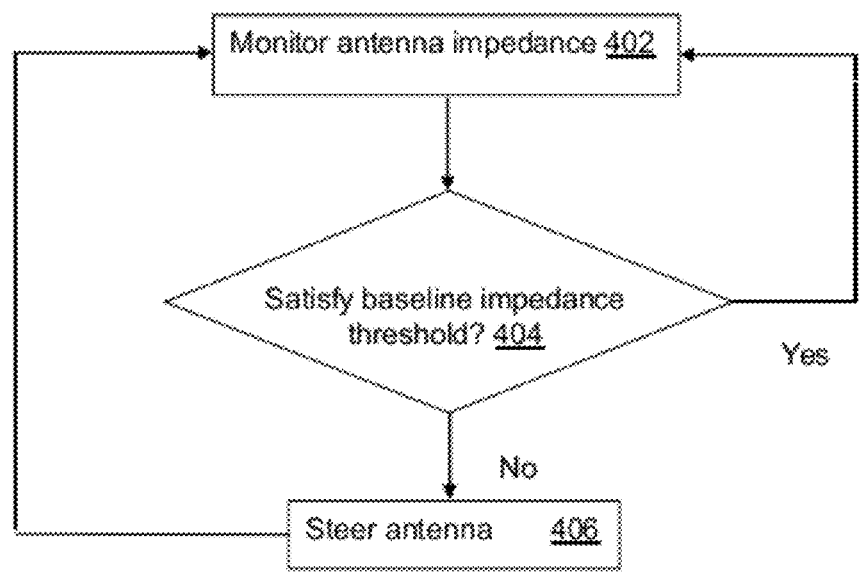
FIG. 4 depicts an exemplary method operating in portions of the communication devices of FIGS. 1-3.

Referring to FIG. 4, method 400 is generally illustrated which allows for adjusting of an antenna in a communication device, such as shown in FIGS. 1-3. Method 400 can begin with monitoring or otherwise determining the impedance and/or the mismatch of the antenna at 402. This determination can be performed in a number of different ways using a number of different components. For example, bi-directional couplers can be used to perform the monitoring. In another embodiment, the couplers can obtain both magnitude and phase information. In 404, if the impedance of the antenna is not equal to a baseline impedance of the same antenna in free space, then an assumption can be made that there is an object near the antenna which is either absorbing or reflecting the antenna's radiation.

In 406, the antenna can be steered or otherwise adjusted when the baseline impedance threshold is not satisfied. Method 400 can return to 402 to monitor the impedance and determine if the absorption or reflection of the object has been accounted for. The steering of the antenna can be performed in an analog manner and/or in discrete steps. For example, the antenna can be steered in a number of different directions while monitoring the antenna's impedance during steer to determine if any of the positions satisfy the baseline impedance threshold. In another embodiment, the impedance values for various positions can be utilized as feedback to determine other positions in which to steer the antenna to satisfy the baseline impedance threshold.

Method 400 allows for steering of the antenna based on antenna impedance, such as by rapidly steering the antenna until a minimum difference between the baseline impedance and measured impedance is achieved. Method 400 can be repeated periodically to further steer the antenna and optimize the system as objects around the antenna shift.

Method 400 illustrates a closed loop steerable system that can automatically reduce or minimize unwanted absorption of power into objects in close proximity to the antenna since the antenna will be steered away from the objects in order to achieve reduced or minimal de-tuning of the antenna. The system can seek to achieve iterative measurements that become closest to the baseline measurement of the antenna. By steering the antenna for minimum deviation from baseline free space conditions, the absorption into that same object can be minimized. This also can increase or maximize the energy radiated to the desired communication point and reduce or minimize the energy wasted as absorbed energy into nearby objects, such as the user. Method 400 can also reduce Specific Absorption Rate (SAR) for the mobile communication device. Method 400 can work with either a fixed match for the antenna, or an RF tunable match for the antenna, such as variable capacitor antenna tuners.

Figure 5:
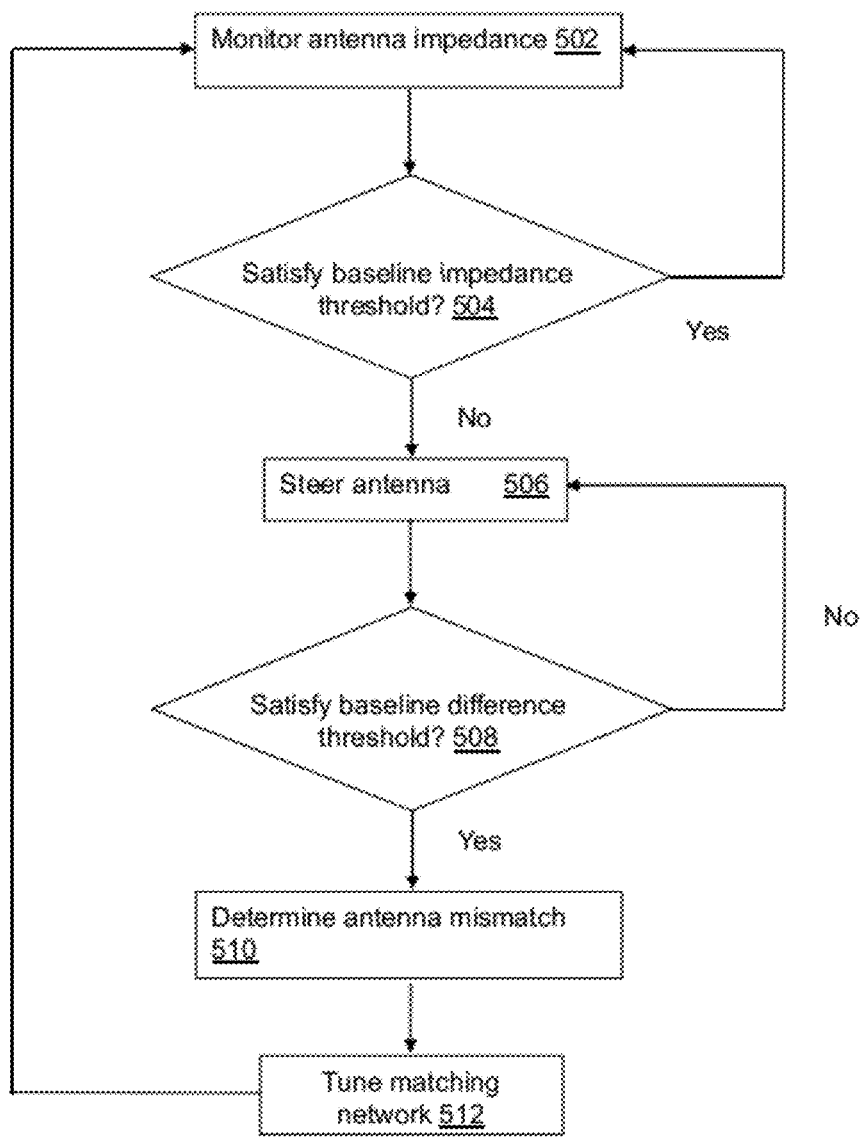
FIG. 5 depicts another exemplary method operating in portions of the communication devices of FIGS. 1-3.

Referring to FIG. 5, method 500 is generally illustrated which allows for adjusting of an antenna in a communication device, such as shown in FIGS. 1-3. Method 500, similar to method 400, provides for monitoring antenna impedance, determining satisfaction of a baseline impedance threshold and steering of the antenna in 502, 504 and 506. In 508, it can be determined if the steering of the antenna has resulted in a minimum difference between the baseline impedance and the measured impedance so as to carry out impedance matching. The antenna steering position can be held constant while the antenna match is now optimized or otherwise improved.

In 510, information can be obtained or otherwise measured to determine the antenna mismatch. In 512, the antenna matching network can be tuned based on the obtained information to reduce or minimize mismatch loss. For example, the same bi-directional couplers can be used to obtain information for this closed loop network as was used for the antenna steering closed loop. In one embodiment, all of the components for the two closed loop algorithms can be shared, except for the RF tuning elements themselves, with the steering tuning elements on the antenna and the matching tuning elements in the antenna match network.

In method 500, once the antenna match has been improved or optimized, the method can return to 502 to further improve or optimize the antenna steering. Method 500 can be repeated, such as alternating between improvement or optimization of steering (minimizing absorption losses) and improvement or optimization of antenna match (minimizing mismatch losses).

Methods 400 and/or 500 can be implemented utilizing other parameters and/or other steps. For example, other parameters other than return loss may be used in conjunction with, or in place of, a direct measurement of antenna impedance through amplitude and phase measurement of the reflected power in the forward and reverse directions at or near the antenna port. For instance, the mobile device can have an internal measure of Received Signal Strength Indicator (RSSI). This is a measure of the reception of communication signals (data or voice) from a base station to a handheld device, such as mobile phone. The RSSI signal can be utilized to determine if the antenna is being blocked by the user or other objects such that signals are being absorbed. The steerable antenna can be steered, such as described in methods 400 and/or 500, until the RSSI signal is improved or maximized, and then the antenna can be further matched via a tunable RF matching network. This improvement or optimization can be repeated in a closed loop manner until the antenna performance is increased or maximized for both RSSI and antenna impedance.

In another embodiment, the base station (or similar infrastructure hub for any wireless device) to which the mobile device is communicating to, can be used as the controlling portion of the system. The base station can send out commands or instructions to the steerable antenna until it maximizes the RF link in transmit and/or receive directions (uplink/downlink) of communications.

The software utilized to perform methods 400 and/or 500 for closed loop control of the steerable antenna and/or the RF tunable antenna match can reside anywhere in the system. For example, the software can reside in dedicated microprocessors for this function, either in the portable device or the base station. In another embodiment, the software can reside in pre-existing microprocessors, such as those in the handset's baseband chipset or RF front end transceiver, or in one of many processors in the base station.

Methods 400 and/or 500 can reduce energy wasted as absorbed or reflected power due to objects/user in close proximity to the mobile device, and can maximize the energy reaching the base station as desired in the communication link. This optimization of transmitted and/or received energy can result in better communication quality for voice and/or data traffic, reduce dropped calls and missed pages, increase coverage/range, and improve battery life. Additional secondary benefits can also be realized, such as reduction in SAR. The steerable antenna of methods 400 and/or 500 can direct the majority of the radiation away from the user and towards the base station, as desired.

In one embodiment, less power wasted as absorbed energy into the user or reflected energy (e.g., in a purse or on a metal table) not reaching the base station, can also allow for reducing the power output of the main power amplifier in the portable device. The main power amplifier may not have to put out as much power if the steerable antenna directs the majority of the energy away from the user and towards the base station. As a result, smaller and more efficient main power amplifiers can be utilized, which will further save power/battery life, reduce cost of the power amplifier, and reduce the size of the power amplifier. Also, power amplifiers that have to generate high power levels also tend to generate significant heat in portable handheld devices. Smaller more efficient power amplifiers operating at lower power levels can also result in lower overall temperatures for these wireless products.

Methods 400 and/or 500 provide a steerable antenna to reduce absorption losses, regardless of which type of steerable antenna is used. Additionally, any type of RF tuning element may be used in the steerable antenna or the tunable RF antenna match. Such tuning technologies include, but are not limited to, doped BST, pure BST, RF switches, MEMS tunable capacitors and varactors, and so forth.

Methods 400 and/or 500 can also be applied to a variety of devices, which are not limited to mobile phones. For example, methods 400 and/or 500 can be applied to WLAN applications, military systems, Bluetooth accessories, notebooks, laptops, wireless gaming, private radio (emergency services) and so forth.

In another embodiment, methods 400 and/or 500 can also be applied to Multiple-Input-Multiple-Output, or MIMO systems. In one embodiment, multiple-antenna diversity systems (e.g., two antennas) can utilize methods 400 and/or 500 to reduce absorption losses.

Figure 6:
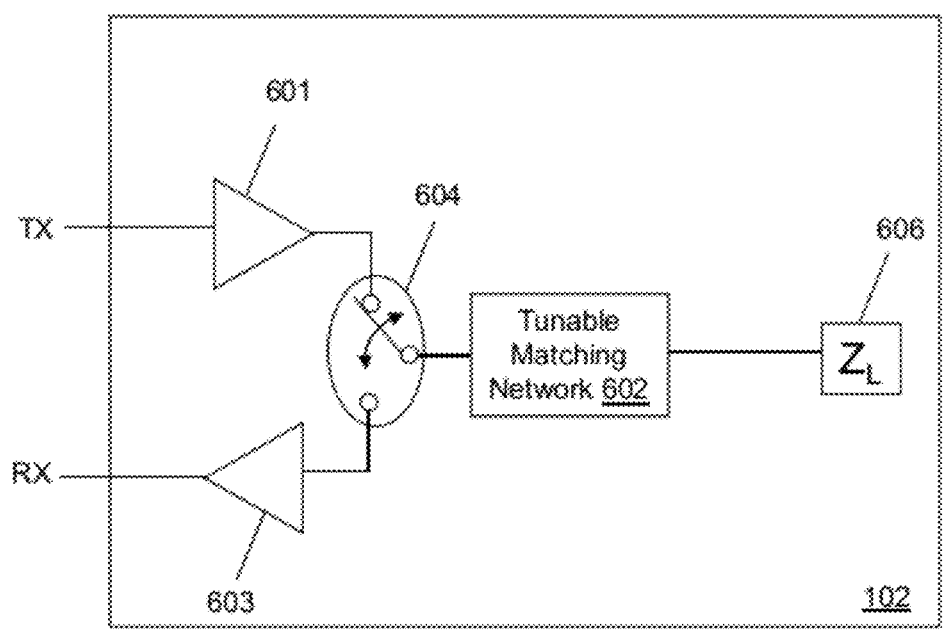
FIG. 6 depicts an illustrative embodiment of a portion of a transceiver of the communication device of FIG. 1.

FIG. 6 depicts an illustrative embodiment of a portion of the wireless transceiver 102 of the communication device 100 of FIG. 1. In GSM applications, the transmit and receive portions of the transceiver 102 can include common amplifiers 601, 603 coupled to a tunable matching network 602 and an impedance load 606 by way of a switch 604. The load 606 in the present illustration can an antenna as shown in FIG. 1 (herein antenna 606). A transmit signal in the form of a radio frequency (RF) signal (TX) can be directed to the amplifier 601 which amplifies the signal and directs the amplified signal to the antenna 606 by way of the tunable matching network 602 when switch 604 is enabled for a transmission session. The receive portion of the transceiver 102 can utilize a pre-amplifier 603 which amplifies signals received from the antenna 606 by way of the tunable matching network 602 when switch 604 is enabled for a receive session. Other configurations of FIG. 6 are possible for other types of cellular access technologies such as CDMA. These undisclosed configurations are contemplated by the present disclosure.

Figure 7:
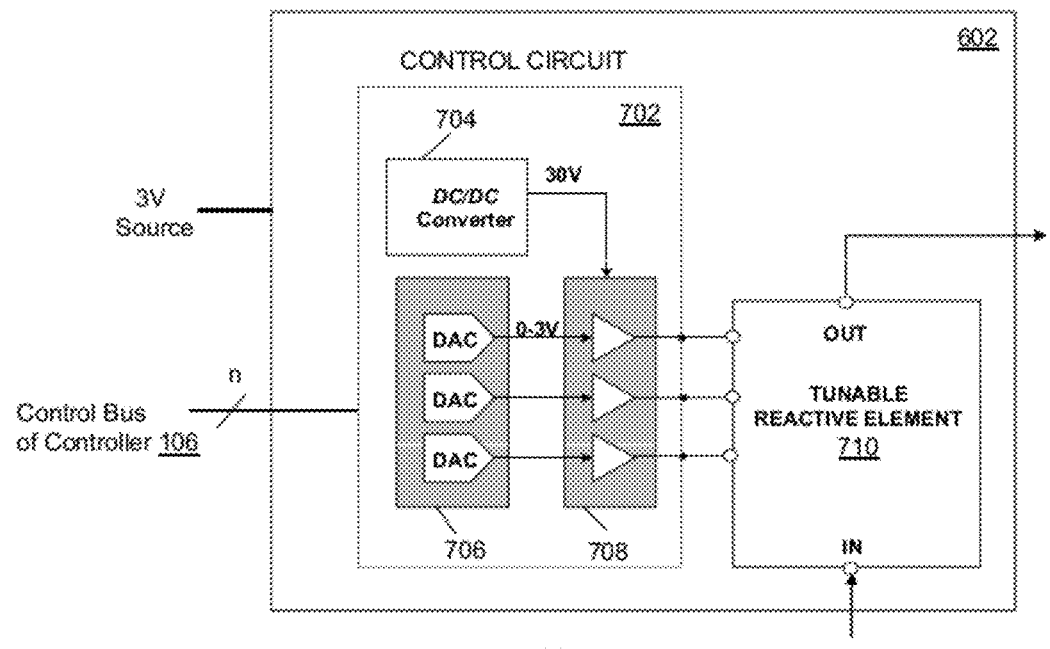
FIGS. 7-8 depict illustrative embodiments of a tunable matching network of the transceiver of FIG. 6.
Figure 8:
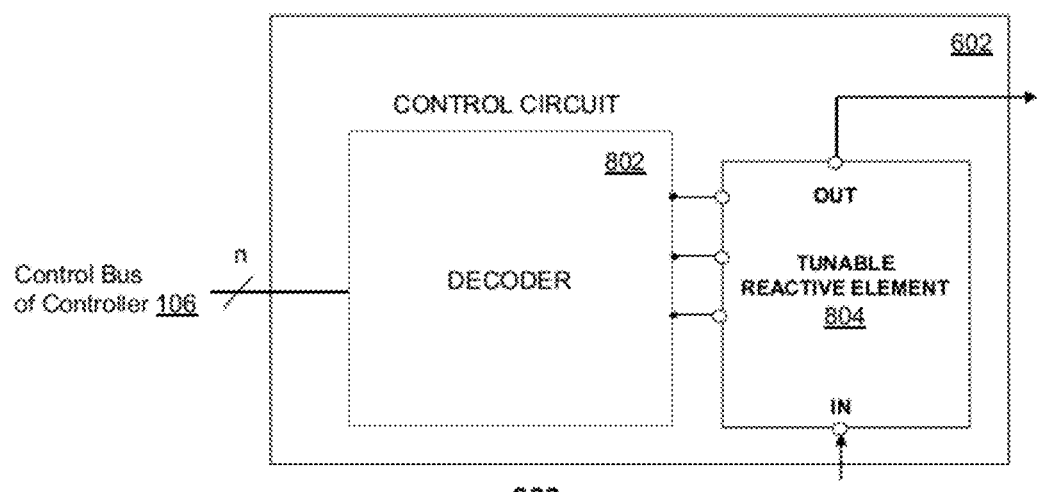
Figure 9:
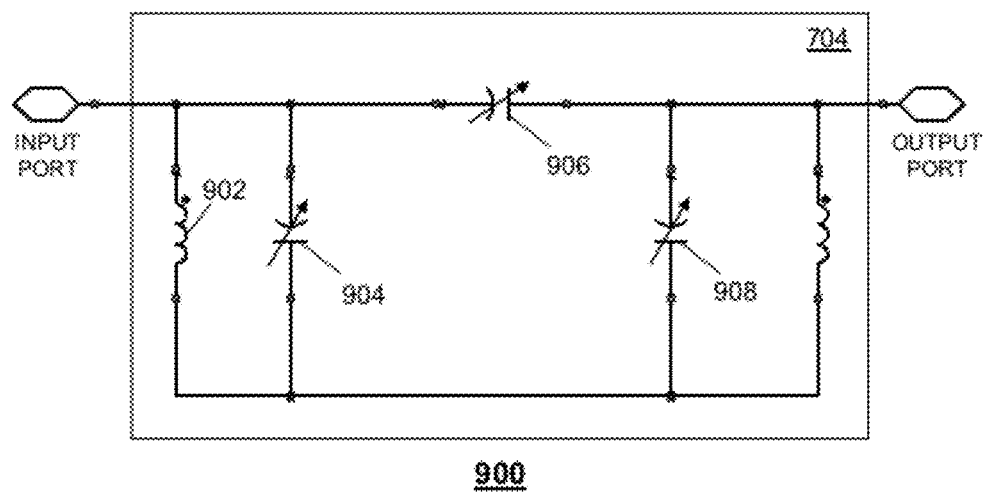
FIGS. 9-10 depict illustrative embodiments of a tunable reactive element of the tunable matching network.

FIGS. 7-8 depict illustrative embodiments of the tunable matching network 602 of the transceiver 102 of FIG. 6. In one embodiment, the tunable matching network 602 can comprise a control circuit 702 and a tunable reactive element 710. The control circuit 702 can comprise a DC-to-DC converter 704, one or more digital to analog converters (DACs) 706 and one or more corresponding buffers 708 to amplify the voltage generated by each DAC. The amplified signal can be fed to one or more tunable reactive components 904, 906 and 908 such as shown in FIG. 9, which depicts a possible circuit configuration for the tunable reactive element 710. In this illustration, the tunable reactive element 710 includes three tunable capacitors 904-908 and an inductor 902 with a fixed inductance. Other circuit configurations are possible, and thereby contemplated by the present disclosure.

The tunable capacitors 904-908 can each utilize technology that enables tunability of the capacitance of said component. One embodiment of the tunable capacitors 904-908 can utilize voltage or current tunable dielectric materials such as a composition of barium strontium titanate (BST). An illustration of a BST composition is the Parascan® Tunable Capacitor. In another embodiment, the tunable reactive element 710 can utilize semiconductor varactors. Other present or next generation methods or material compositions that can support a means for a voltage or current tunable reactive element are contemplated by the present disclosure.

The DC-to-DC converter 704 can receive a power signal such as 3 Volts from the power supply 114 of the communication device 100 in FIG. 1. The DC-to-DC converter 704 can use common technology to amplify this power signal to a higher range (e.g., 30 Volts) such as shown. The controller 106 can supply digital signals to each of the DACs 706 by way of a control bus of "n" or more wires to individually control the capacitance of tunable capacitors 904-908, thereby varying the collective reactance of the tunable matching network 602. The control bus can be implemented with a two-wire common serial communications technology such as a Serial Peripheral Interface (SPI) bus. With an SPI bus, the controller 106 can submit serialized digital signals to configure each DAC in FIG. 7 or the switches of the tunable reactive element 804 of FIG. 8. The control circuit 702 of FIG. 7 can utilize common digital logic to implement the SPI bus and to direct digital signals supplied by the controller 106 to the DACs.

Figure 10:
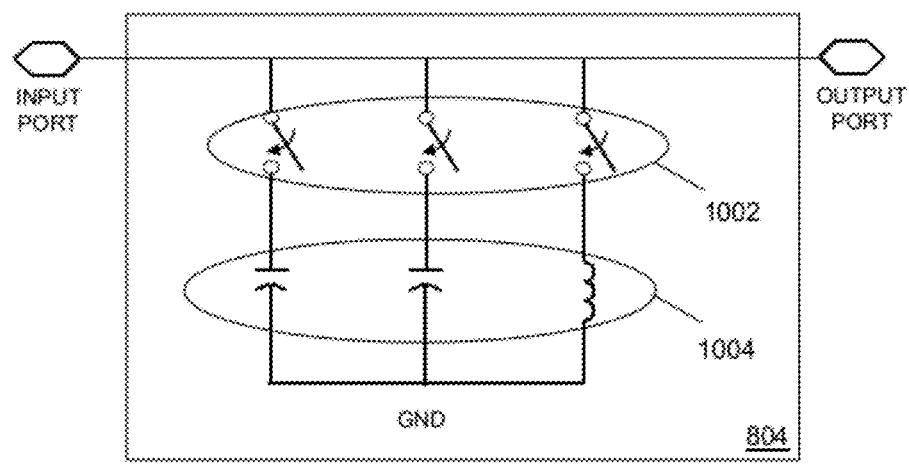

In another embodiment, the tunable matching network 602 can comprise a control circuit 802 in the form of a decoder and the tunable reactive element 804 comprising switchable reactive elements such as shown in FIG. 10. In this embodiment, the controller 106 can supply the control circuit 802 signals via the SPI bus which can be decoded with common Boolean or state machine logic to individually enable or disable the switching elements 1002. The switching elements 1002 can be implemented with semiconductor switches or micro-machined switches such as utilized in micro-electromechanical systems (MEMS). By independently enabling and disabling the reactive elements (capacitor or inductor) of FIG. 10 with the switching elements 1002, the collective reactance of the tunable reactive element 804 can be varied. Other components can also be utilized, such as piezoelectric components.

The tunability of the tunable matching networks 602, 604 provides the controller 106 a means to optimize performance parameters of the transceiver 102 such as, for example, but not limited to, transmitter power, transmitter efficiency, receiver sensitivity, power consumption of the communication device, a specific absorption rate (SAR) of energy by a human body, frequency band performance parameters, and so on.

From the foregoing descriptions, it would be evident to an artisan with ordinary skill in the art that the aforementioned embodiments can be modified, reduced, or enhanced without departing from the scope and spirit of the claims described below. A number of the embodiments described above, include a closed loop iterative system for steering the antenna and/or tuning the matching network. However, the present disclosure also contemplates utilizing an open loop system for steering the antenna and/or tuning the matching network which can include one or more of the steps described herein and/or utilize one or more of the components described herein. Methods 400 and/or 500 can be applied to innumerable combinations of use cases, bands, sub-channels of bands, and other performance parameters which have not been addressed in the present disclosure. These undisclosed combinations are contemplated by the present disclosure.

In one exemplary embodiment, the steering of the antenna can be optimized or otherwise adjusted for low SAR and maximizing or improving the link to a basestation, such as based on monitoring an antenna impedance and/or using a closed loop process. The exemplary embodiment can also further optimize or otherwise adjust antenna impedance match, using either or both of an open loop tuning methodology or a closed loop tuning methodology. The exemplary embodiments can utilize various components and combinations of components to perform antenna steering and/or impedance matching. The present disclosure also contemplates utilizing one or more techniques and/or components described herein with respect to the exemplary embodiments with other methods and/or components for RF tuning and/or antenna steering that are not described herein.

In one exemplary embodiment, the system can perform a number of iterations of the adjusting of the steerable antenna to satisfy an impedance threshold. However, the steerable antenna may not reach the threshold. An iteration threshold can be established. For example, a closed loop impedance matching process can be implemented when the number of iterations for adjusting the steerable antenna exceeds a pre-determined value. In one embodiment, the closed loop impedance matching process can utilize a last known antenna steering position when the pre-determined value was exceeded.

Other suitable modifications can be applied to the present disclosure. Accordingly, the reader is directed to the claims for a fuller understanding of the breadth and scope of the present disclosure.

Figure 11:
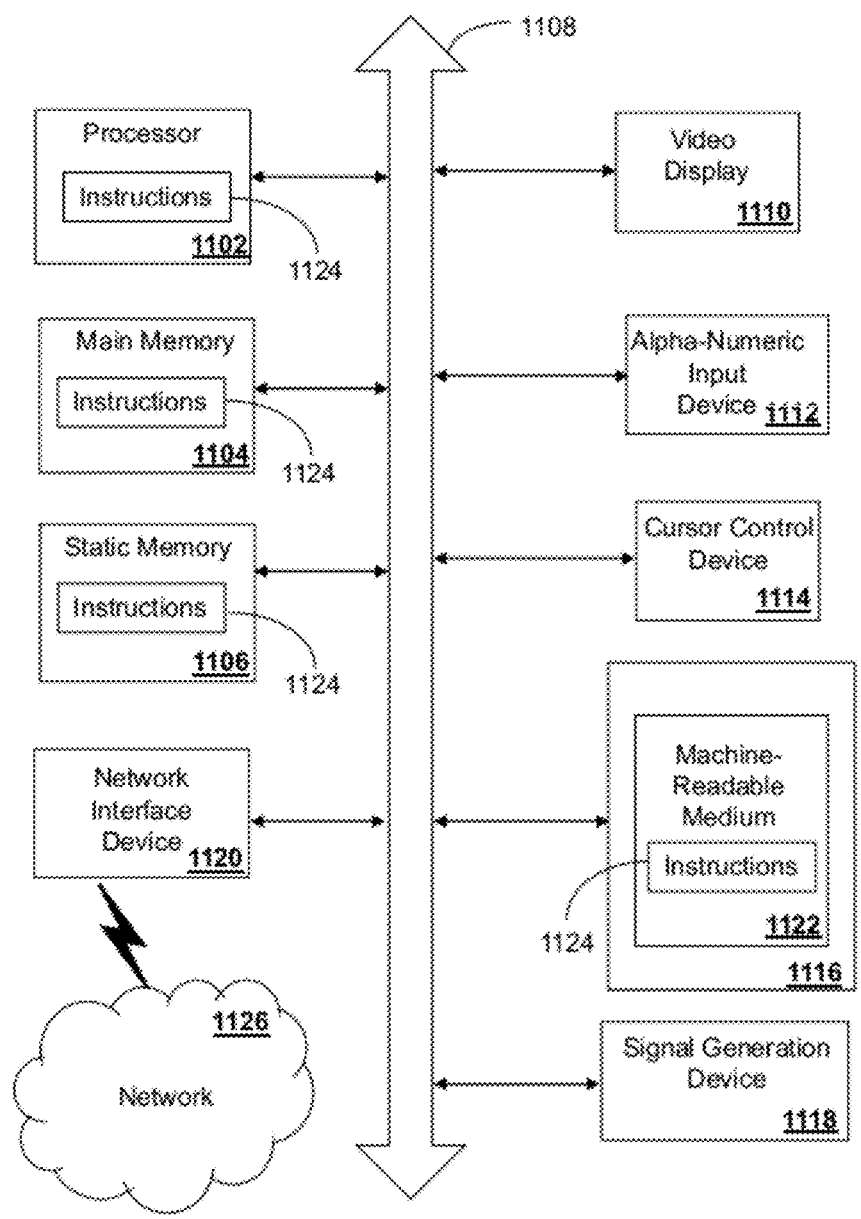
FIG. 11 depicts an exemplary diagrammatic representation of a machine in the form of a computer system within which a set of instructions, when executed, may cause the machine to perform any one or more of the methodologies disclosed herein.

FIG. 11 depicts an exemplary diagrammatic representation of a machine in the form of a computer system 1100 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, a solid state display, or a cathode ray tube (CRT)). The computer system 1100 may include an input device 1112

(e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a machine-readable medium 1122 on which is stored one or more sets of instructions (e.g., software 1124) embodying any one or more of the methodologies or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus operably coupled with a mobile communication device, the apparatus comprising:
 a memory; and
 a controller coupled with the memory, wherein the controller performs operations comprising:
  adjusting an antenna pattern of a steerable antenna of the mobile communication device to reduce obstruction in a near field of the steerable antenna in response to a determination of an antenna mismatch, wherein the adjusting of the antenna pattern of the steerable antenna is based on a received signal strength indicator; and adjusting a matching network of the mobile communication device, wherein the adjusting of the antenna pattern of the steerable antenna and the adjusting of the matching network are based on closed loop iterations.

2. The apparatus of claim 1, wherein the controller performs operations further comprising:

obtaining an operational parameter associated with the steerable antenna; and determining whether the mobile communication device satisfies an impedance threshold based on the operational parameter.

3. The apparatus of claim 2, wherein the operational parameter is obtained before and after the adjusting of the steerable antenna.

4. The apparatus of claim 3, wherein changes in the operational parameter are utilized as feedback for determining a position for the steerable antenna during the adjusting of the steerable antenna.

5. The apparatus of claim 2, wherein the operational parameter comprises a magnitude and a phase of a reflected power associated with the steerable antenna.

6. The apparatus of claim 2, wherein the obtaining of the operational parameter is performed using a directional coupler.

7. The apparatus of claim 2, wherein the adjusting of the matching network of the mobile communication device is in response to the antenna mismatch.

8. The apparatus of claim 2, wherein the impedance threshold is based on one or more values stored in a memory of the mobile communication device.

9. The apparatus of claim 1, wherein the adjusting of the matching network or the adjusting of the steerable antenna utilizes at least one of an electrically tunable capacitor, a semiconductor varactor, a micro-electro-mechanical systems (MEMS) varactor, a MEMS switched reactive element, a piezoelectric components or a semiconductor switched reactive element.

10. The apparatus of claim 1, wherein the controller is configured to obtain an RF voltage associated with the steerable antenna, and wherein the adjusting of the steerable antenna and the adjusting of the matching network is based on the RF voltage.

11. The apparatus of claim 10, wherein the RF voltage is obtained from a directional coupler operably coupled with the steerable antenna.

12. The apparatus of claim 1, wherein the mobile communication device comprises a multiple antenna system.

13. The apparatus of claim 1, wherein the controller is configured for:

communicating steering data with a base station; and adjusting the steerable antenna based on the steering data.

14. An apparatus operably coupled with a mobile communication device, the apparatus comprising:

a memory; and a controller coupled with the memory, wherein the controller performs operations comprising:

adjusting an antenna pattern of a steerable antenna of the mobile communication device to reduce obstruction in a near field of the steerable antenna in response to a determination of an antenna mismatch; and adjusting a matching network of the mobile communication device, wherein the adjusting of the matching network is performed while an antenna steering position is held constant.

15. A non-transitory computer-readable storage medium, comprising computer instructions which, responsive to being executed by a processor, cause the processor to perform operations comprising:

obtaining at least one operational parameter associated with a communication device;

adjusting an antenna pattern of a steerable antenna of the communication device responsive to a determination that the communication device does not satisfy an impedance threshold, wherein satisfying of the impedance threshold is determined based on the at least one operational parameter; and adjusting a matching network of the communication device based on the at least one operational parameter, wherein the adjusting of the matching network is performed while an antenna steering position is held constant, wherein the adjusting of the steerable antenna is performed without using proximity sensors, and wherein the adjusting of the steerable antenna includes moving a steerable lobe pattern associated with the steerable antenna.

* * * * *